(12) United States Patent
Pack et al.

(10) Patent No.: US 6,500,376 B1
(45) Date of Patent: Dec. 31, 2002

(54) MULTIPLE INJECTION COMPRESSION MOLDING PROCESS

(75) Inventors: Craig William Pack, Huron, OH (US); Ronald Dennis Polley, Sandusky, OH (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/492,413

(22) Filed: Jan. 27, 2000

(51) Int. Cl.[7] .................................................. B28B 7/22
(52) U.S. Cl. .................. 264/255; 264/328.7; 264/328.8; 264/2.2; 425/130
(58) Field of Search .......................... 264/255, 2.2, 294, 264/328.7, 328.8; 425/810, 406, 130

(56) References Cited

U.S. PATENT DOCUMENTS

| | | | |
|---|---|---|---|
| 2,938,232 A | | 5/1960 | Martin |
| 3,363,039 A | * | 1/1968 | Nagai et al. |
| 3,597,425 A | * | 8/1971 | Shaines |
| 4,076,788 A | * | 2/1978 | Ditto |
| 4,900,242 A | | 2/1990 | Maus et al. |
| 5,008,052 A | | 4/1991 | Harada |
| 5,012,426 A | | 4/1991 | Harada et al. |
| 5,251,146 A | | 10/1993 | Neko et al. |
| 5,470,513 A | | 11/1995 | Nogawa et al. |
| 5,529,483 A | | 6/1996 | Abe et al. |
| 5,676,901 A | * | 10/1997 | Higashi et al. |
| 5,750,060 A | | 5/1998 | Maus et al. |
| 6,095,786 A | * | 8/2000 | Inoue et al. |
| 6,143,226 A | * | 11/2000 | Fujimoto et al. |
| 6,180,043 B1 | * | 1/2001 | Yonemochi et al. |
| 6,238,197 B1 | * | 5/2001 | Van Hout et al. |

FOREIGN PATENT DOCUMENTS

| | | | |
|---|---|---|---|
| JP | 01139232 A | * | 5/1989 |
| JP | 07266378 A | * | 10/1995 |

* cited by examiner

Primary Examiner—Jan H. Silbaugh
Assistant Examiner—Geoffrey P. Shipsides
(74) Attorney, Agent, or Firm—John E. Kajander

(57) ABSTRACT

A method of injection molding a layered plastic component includes providing a sealing structure around the periphery of a mold cavity formed between first and second mold halves to contain plastic material in the cavity during injection. The first and second mold halves are closed to a first gap therebetween. A first plastic material is injected into the cavity. The first and second mold halves are closed together to a full closure position to compress the first plastic material. The first and second mold halves are held together for a period of time sufficient to partially solidify the first plastic material. The first and second mold halves are opened to a second gap therebetween, and at least one stop member is moved into position between the first and second mold halves. A second plastic material is injected into the mold cavity, and the first and second halves are closed together against said stop member, and the mold halves are maintained in this position for solidification of the second plastic material to form the layered plastic component.

14 Claims, 3 Drawing Sheets

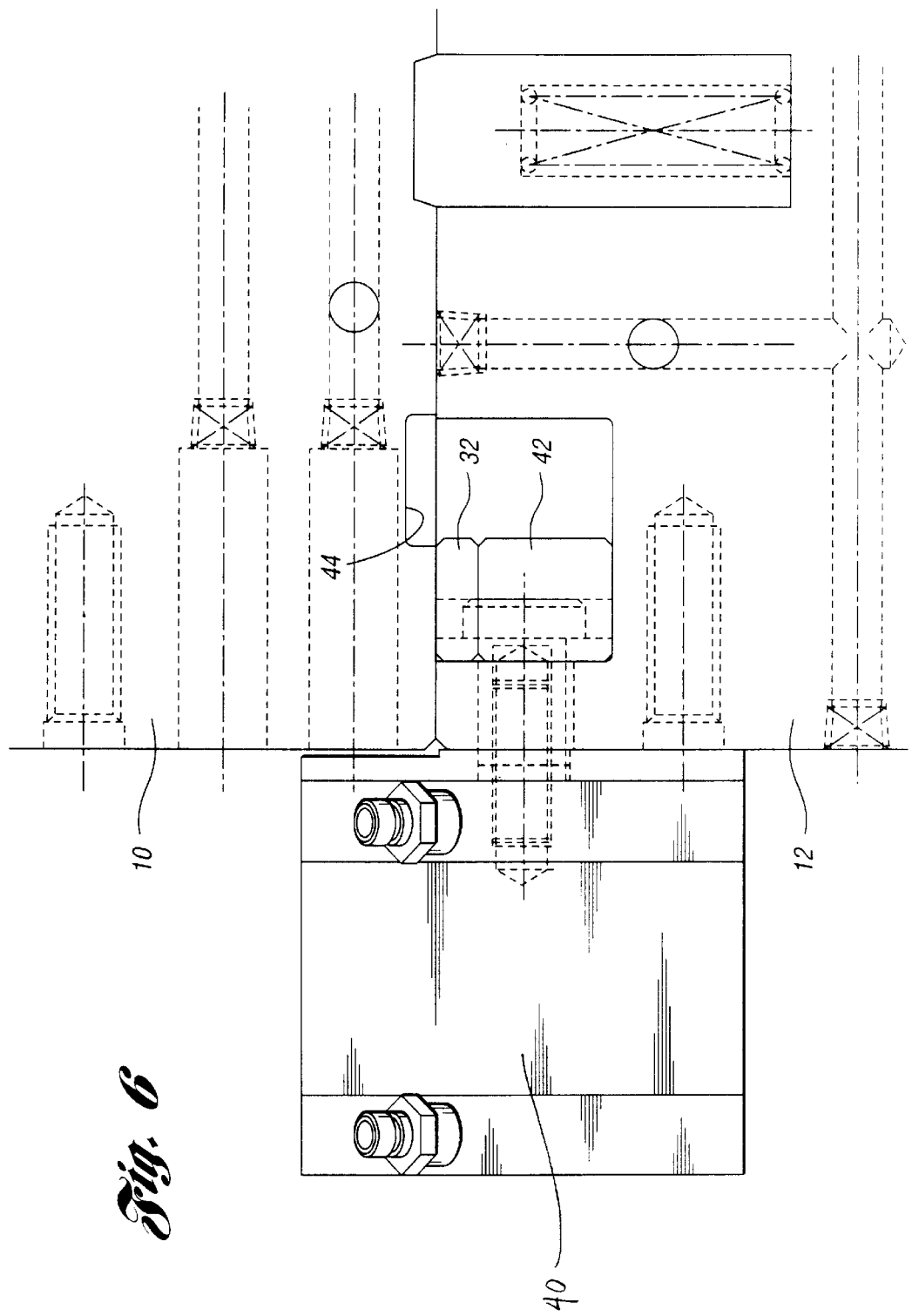

MULTIPLE INJECTION COMPRESSION MOLDING PROCESS

TECHNICAL FIELD

The present invention relates to a multiple injection compression molding process using sequential or simultaneous injection compression cycles to create a multi-layered plastic component having controlled layer thickness.

BACKGROUND OF THE INVENTION

Various methods are known for manufacturing multi-layered plastic components, such as overmolding, co-injection molding, and insert molding of films. One product application in which multi-layered plastic manufacturing is useful is in vehicle headlamp reflectors. Such reflectors are typically metallized on the interior thereof to reflect light forward of the vehicle. Recent styling trends have further complicated the headlamp reflector by the incorporation of "facets" which form the optic prescription used to direct light and form the headlight beam pattern onto the road. In the past, these facets were included on the headlamp lens. The addition of these facets to the headlamp reflector has resulted in the need of a more thermally stable plastic material than what was traditionally used for headlamp reflectors. This plastic material is much more expensive than its predecessor. Accordingly, it is desirable to minimize the use of such material. Therefore, it is desirable to manufacture headlamp reflectors in multiple layers of plastic, with a thin layer of metallizable plastic on the interior of the reflector to minimize the use of such expensive material.

Injection/compression molding has not been used for each and every shot of material injected into a tool to manufacture multi-layered plastic components. Injection/compression techniques can generally be divided into two types: (1) clamp-end injection/compression: Compression induced by movable platen motion, or molding machine clamp-end compression; and (2) auxiliary component injection/compression: Full molding machine clamp-up (no movable platen motion), with mold-cavity compression induced by auxiliary moving components internal to the mold set (usually driven by their own springs or auxiliary hydraulic cylinders).

Each of these injection/compression techniques is discussed below.

1. Clamp-end injection/compression or "coining":

First disclosed by Martin (U.S. Pat. No. 2,938,232, issued May 31, 1960) but popularized by Engel's "sandwich press" toggle-clamp injection molding techniques (see, for example, Engle brochure A-24-TV-4/75, Ludwig Engel, Canada Ltd., Guelph, Ontario, Canada), this approach in each case generally involves the following process sequence:

a. From their full-open position, the mold platens and mold halves (and opposing male and female cavities formed thereby) are brought together until a predetermined air gap is present at the parting line.

b. At that point, a very low pressure, low-velocity injection fill begins (to prevent molten plastic from splashing through the air gap).

c. After injection fill is completed and the molten polymer mass is allowed to cool for a predetermined time interval, the injection molding machine commences a closing motion of the movable platen. This clamping-up motion mechanically seals off the mold cavity and its partially solidified contents to zero-clearance at the parting line, thus locking up the mold halves for the duration of the molding cycle at some predetermined clamp pressure.

d. Under this clamp pressure, the partially solidified polymer mass is compressed due to the reduced separation of the male and female dies precise mold surfaces being brought nearer together by the air-gap distance existing at the parting line when initial injection started. By eliminating this air gap, the volume of the cavity-and-runner system is proportionately reduced, resulting in compressive forces being exerted upon the partially solidified polymer contents, causing a reorientation and re-flow phenomenon.

e. Held under this clamp-induced compressive force, the mold cavity's contents continue cooling and solidifying, eventually reaching a temperature sufficiently below the glass-transition temperature of that polymer (in the case of polycarbonate, $T_g$=296 degrees F.) that the molded article may be safely ejected without risking optical distortion. Then the whole cycle starts again, as the movable platen is moved to the predetermined air-gap position to await injection of the next shot.

While clamp-induced coining offers considerable advantages over straight injection, the current state-of-arts in such clamp-induced coining gives optimum results only within a narrow band of process parameters or setup conditions. Such successful coining is a function of:

a. Initial injection pressure and fill rate;

b. Air-gap dimension;

c. Timing interval between injection and compression; and d. Final clamping forces.

Especially critical is control of injection pressure and fill rate, along with the timing interval. In order to prevent molten polymer from spilling outside the desired runner-mold-cavity configurations, the injected melt must be allowed to form a surface skin and partially solidify. Otherwise, molten polymer spills or "flashes" into the air-gap, necessitating costly and laborious trimming operations on the molded part. Even worse, if the melt has solidified to too great an extent, compression at ultimate clamping pressures can cause hobbing or deformation of the mating plates at the parting line, thus damaging the mold set. Cooling time interval is additionally critical to achieving acceptable molded part yields, since if the melt is not sufficiently solidified at its most constrictive point (i.e., gate freeze-off has not been completed), then partially molten polymer can still be extruded under this compressive force back out of the cavity and into the runner system, which can then result in an underfilled and underpacked part with badly distorted surfaces. On the other hand, if compression is delayed too long, too much polymer solidification will have occurred when the compressive force trough final clamp-up is initiated, resulting in forcible reorientation of the polymer and "cold working" of the plastic, which in turn produces birefringence and undesirable molded-in stress levels, with resulting localized nonuniform light-bending characteristics.

Illustrative of these problems in the context of optical disk molding is Bartholdesten et al (U.S. Pat. No. 4,409,169), which teaches the need for a slow (up to 3 seconds), low-pressure injection of an oversized shot into a partially open (air gap) mold parting line, then providing for deliberate melt cooling and viscosity-thickening, followed by a short pressing stroke (typically ⅕ to ¹⁄₁₀ the disk's thickness, or 0.005–0.010 inch) which initially squeezes out of the reduced mold cavity volume the partially cooled and viscous excess plastic, then as the pressing continues to the fully closed parting line position (zero clearance), this radially extruded overflow is pinched off and full clamping force is thereafter maintained for shrinkage compensation and to assure no prerelease.

Another clamp-induced disk coining process is disclosed in Matsuda et al (U.S. Pat. Nos. 4,442,061 and 4,519,763) wherein, into a slightly opened mold set, a melt is injected and cooled till fully solidified, then reheated till uniformly above the plastic's melt temperature, at which point clamp actuated compressive stroke is conventionally delivered and maintained through this second cooling cycle.

2. Auxiliary Component Injection/Compression:

As noted above, another type of molding process (termed an "auxiliary component" process for the sake of discussion) includes the use of auxiliary springs, cylinders or the like which function to apply a compressive force to the opposing surfaces and which are commonly internal to the mold itself or as peripheral apparatus thereto. The primary difference between "auxiliary component" molding and clamp-end injection/compression, therefore, is that mold compression is provided by a stroke-producing element inherent to known modern injection molding machines (examples of same are the ejector or movable platen driving mechanisms such as the main clamp) in the latter whereas mold compression is provided by auxiliary springs or hydraulic cylinders, for example, in the former. Furthermore, clamp-end injection/compression motions are inherently sequenced through and coordinated by the molding machines process control system, whereas auxiliary component compression is controlled (if not self-action, like springs) separately by timers, etc., not supplied with the standard machine.

A further differentiation is that auxiliary component compression does not employ motions of the movable platen to provide compressive forces to reduce variable volume cavity (s), and instead employs a fully clamped-up mold with no relative motion of the A and B mold clamp plates or no relative motion of fixed and movable platens during the injection fill and the cavity-volume-reducing compression and cooling portions of the molding cycle.

U.S. Pat. No. 4,900,242, which is hereby incorporated by reference in its entirety, provides a summary of various prior art injection/compression technologies.

It is desirable to provide an improved method of manufacturing multi-layered plastic components utilizing either of the above-mentioned injection/compression techniques to provide improved control over thickness and location of the different plastic materials.

DISCLOSURE OF THE INVENTION

The present invention uses sequential injection/compression cycles to create a multi-layered plastic component with improved control over thickness and location of the layers. This process improves flexibility in thickness and location of the material layers which could not be achieved with co-injection, and would not be cost effective with the use of a thin film inserted into the mold.

More specifically, the present invention, utilizing a variation of clamp-end injection/compression, provides a method of injection molding a layered plastic component including the steps of: a) providing a sealing structure around the periphery of a mold cavity formed between first and second mold halves to contain plastic material in the cavity during injection; b) closing the first and second mold halves to a first gap therebetween; c) injecting a first plastic material into the cavity; d) closing the first and second mold halves together to a full closure position; e) holding the first and second mold halves together for a period of time sufficient to partially solidify the first plastic material; f) opening the first and second mold halves to a second gap therebetween; g) moving at least one stop member into position between the first and second mold halves; h) injecting a second plastic material into the mold cavity; and i) closing the first and second halves together against the stop member, and maintaining the mold halves against the stop member for solidification of the second plastic material to form the layered plastic component.

Accordingly, an object of the invention is to provide a method of manufacturing a multi-layered plastic component with improved control over thickness and location of the plastic layers.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 6 shows a partial vertical crosssectional view of the first and second mold halves and stop member illustrated in FIG. 5;

DETAILED DESCRIPTION OF THE PREFERRED EMBODIMENT

The present invention requires a multiple injection unit machine with injection/compression capability. The invention involves using sequential injection compression cycles to create a layered plastic component of two or more layers of different materials. For purposes of this description, the process will be described injecting two materials to produce the molded component.

Figure 1:
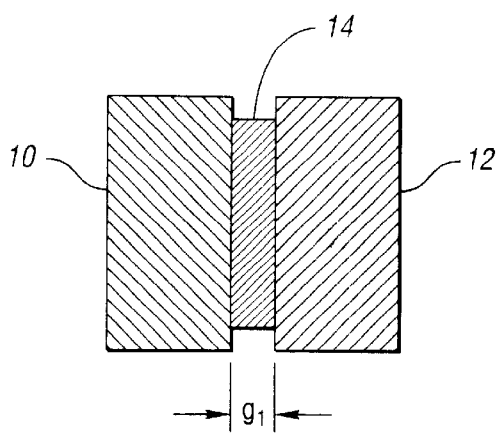
FIG. 1 shows a schematic side view of first and second mold halves with a sealing ring therebetween.

To begin the cycle, the first and second mold halves 10,12, shown in FIG. 1, are closed to a first gap ($g_1$) therebetween. The gap ($g_1$) is preferably 0.150 inch in an application in which a headlamp reflector is manufactured. The mold includes a sealing structure 14 at the parting line around the periphery of the mold cavity formed between the first and second mold halves 10,12 to contain the plastic material during injection.

Figure 2:
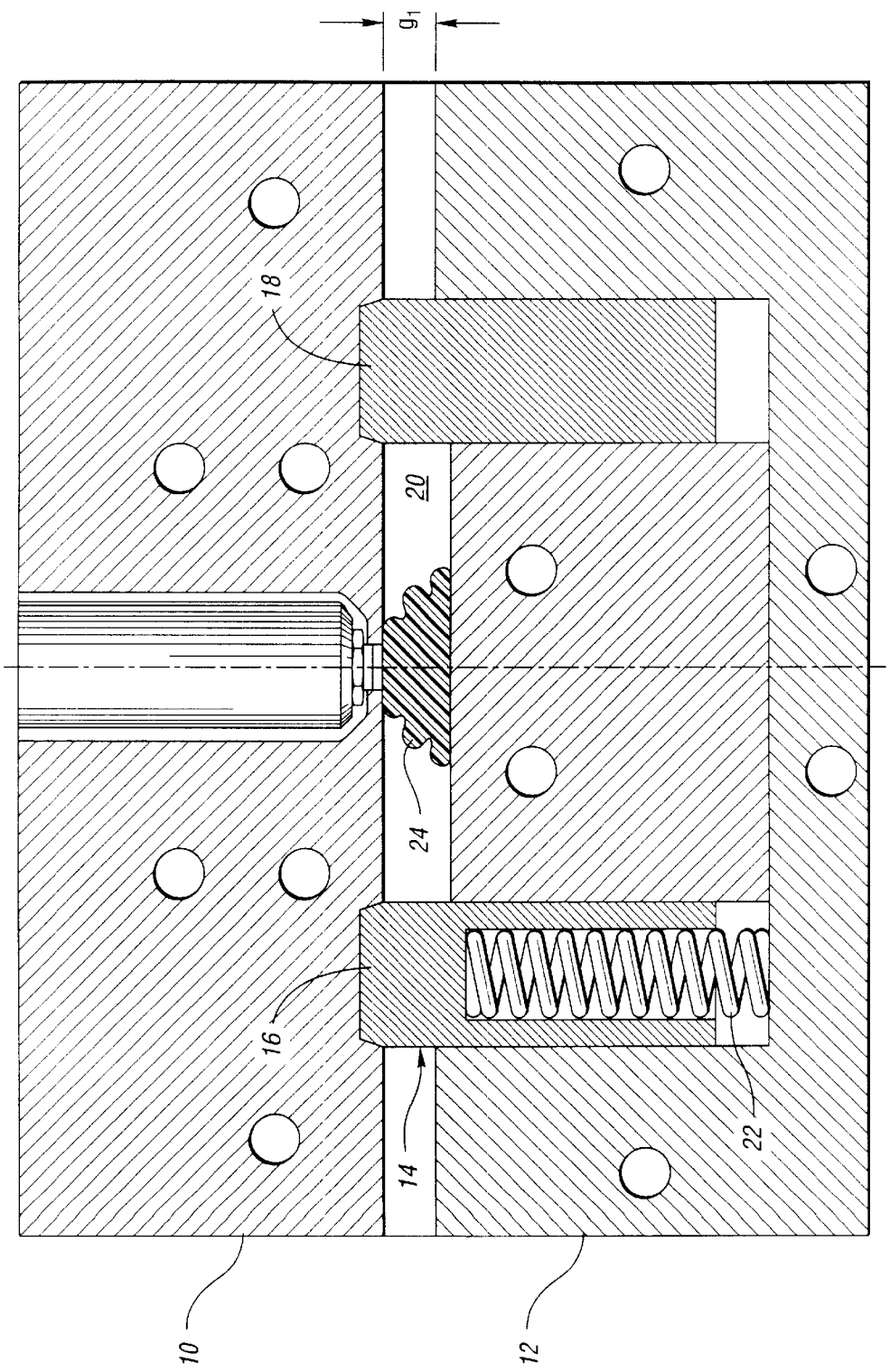
FIG. 2 shows a vertical cross-sectional view of the first and second mold halves and sealing ring of FIG. 1.

The sealing structure 14 is more clearly shown in FIG. 2. The sealing structure 14 includes movable barriers 16,18 movably connected to the second mold half 12 surrounding the mold cavity 20, and spring-loaded by springs 22 toward the first mold half 10 to enclose the mold cavity 20 when the first and second mold halves 10,12 are moved toward and away from each other, thereby containing the plastic material 24 within the cavity 20. Accordingly, with this sealing structure 14, the first and second mold halves 10,12 need not be in contact with each other for injection of plastic in the mold cavity.

With the first and second mold halves 10,12 at the first gap ($g_1$), the first material 24 is injected into the mold cavity 20, as shown in FIG. 2. This first material 24 is injected at a low pressure, such as 25% of the available machine injection pressure.

Figure 3:
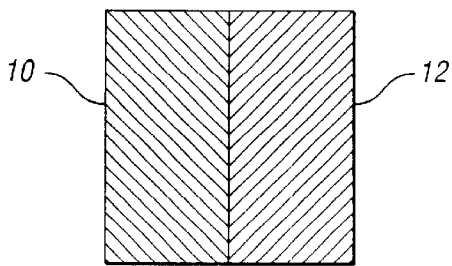
FIG. 3 shows a schematic side view of the first and second mold halves of FIG. 1 in the closed position.

After the majority of shot of the first material 24 has been injected into the mold, the moving platen of the injection molding machine is advanced to move the first and second mold halves 10,12 together to the full closure position, shown in FIG. 3. This movement of the first and second mold halves together may be commenced sequentially, i.e., after the injection of the first plastic material 24 has been completed, or it may be commenced simultaneously, i.e., after the step of injecting the first plastic material is 95% to 99% complete.

Figure 4:
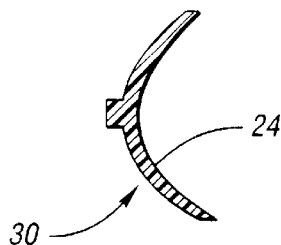
FIG. 4 shows a cross-sectional view of a headlamp reflector including only a first layer of plastic prior to injection/compression of a second layer.

An example of a component 30 at this stage of the process is shown in FIG. 4, and comprises only the first plastic material 24.

Figure 5:
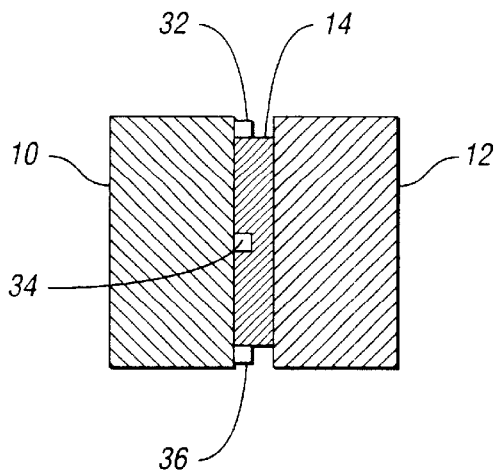
FIG. 5 shows a schematic side view of the first and second mold halves and sealing ring of FIG. 1 with stop members moved into position between the mold halves.

After sufficient hold time to at least partially solidify the shot of first material 24, the first and second mold halves 10,12 are open again to the gap ($g_1$) for injection of a second material. The component 30 is not ejected from the mold at this time. During this mold open sequence, stop members 32,34,36, shown in FIG. 5, are moved into position between the first and second mold halves 10,12 that will serve to create a different mold close setting.

Referring to FIG. 6, the structure associated with the stop member 32 is shown. A hydraulic cylinder 40 is operatively connected to a laterally movable component 42, which is connected to the stop member 32 for moving the stop member 32 laterally between a first position in which it is aligned with the pocket 44 shown in FIG. 6 to allow full closure of the mold halves 10,12 together, and a second position shown in FIG. 6 wherein the stop member 32 abuts the first mold half 10 to form a small gap (not visible in FIG. 6) between the first and second mold halves 10,12. The stop member 32 may be replaced with a differently sized stop member by simply detaching it from the component 42, and replacing it with a larger or smaller stop member. In this manner, the stop gap between the first and second mold halves 10,12 may be adjusted for different materials or different products.

Figure 7:
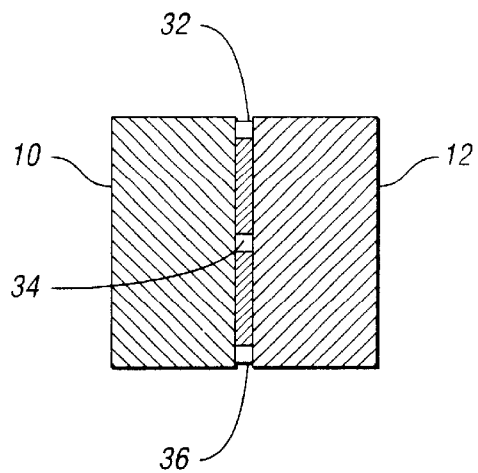
FIG. 7 shows a schematic side view of the first and second mold halves of FIG. 5 in the closed position against the stop members.

With the mold halves 10,12 still opened to the gap $g_1$, the second plastic material is injected into the mold cavity 20. Again, the sealing structure 14 will contain the second plastic material in the cavity during injection. After injection of the second plastic material into the mold cavity has been completed, or at least 95% to 99% completed, the moving platen is advanced by the clamp to full closure onto the stop members 32,34,36, as illustrated in FIG. 7. The gap created by the stop members 32,34,36 provides room in the mold cavity for the second material to be formed. After sufficient cure time, the mold halves 10,12 are opened and the finished component is ejected from the mold.

Figure 8:
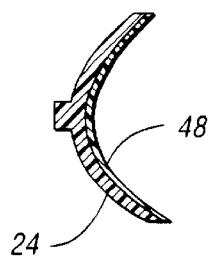
FIG. 8 shows a vertical cross-sectional view of the headlamp reflector of FIG. 4 after a second material layer has been injection/compression molded thereon.

An example of a completed component using this process with two materials is shown in FIG. 8, wherein the second plastic material 48 has been molded onto the first plastic material 24. Because the second plastic material 48 is injected against the first plastic material 24 when the first plastic material 24 is still hot, the first and second materials 24,48 bond together.

The above-described process is particularly useful in manufacturing headlamp reflectors wherein the first material 24 comprises a relatively inexpensive thermally stable filled material, such as polyester, and the second material 48 comprises a metallizable material such as polycarbonate, PEI (such as Ultem from GE Plastics Corp.), or a polyester film. The layer of the second material 48 can be made substantially thin to reduce usage of such expensive material 48. This reduces costs over prior art methods, such as inserting a film into the mold cavity, because the cost of injection moldable grade metallizable material is significantly less than that of plastic films. In addition, the cost of thermoforming the film is eliminated.

While the best mode for carrying out the invention has been described in detail, those familiar with the art to which this invention relates will recognize various alternative designs and embodiments for practicing the invention within the scope of the appended claims.

What is claimed is:

1. A method of injection molding a layered plastic component comprising:

providing a sealing structure around the periphery of a mold cavity formed between first and second mold halves to contain plastic material in the cavity during injection;

closing the first and second mold halves to a first gap therebetween;

injecting a first plastic material into the cavity;

closing the first and second mold halves together to a full closure position;

holding the first and second mold halves together for a period of time sufficient to partially solidify the first plastic material;

opening the first and second mold halves to a second gap therebetween;

moving by lateral actuation at least one stop member into position between the first and second mold halves by providing the stop member laterally moveable with respect to one of the first and second mold halves, and moving the step member between a first position in alignment with a corresponding pocket on the other mold half and a second position out of alignment with the pocket and abutting the other mold half to form a gap between the first and second mold halves;

injecting a second plastic material into the mold cavity; and closing the first and second halves together against said stop member, and maintaining the mold halves against the stop member for solidification of the second plastic material to form the layered plastic component.

2. The method of claim 1, wherein said first and second gaps are equal.

3. The method of claim 1, wherein said step of closing the first and second mold halves together to a full closure position is commenced prior to completion of said step of injecting a first plastic material.

4. The method of claim 1, wherein said first plastic material comprises an inexpensive material and said second plastic material is an expensive material relative to the first plastic material and forms a thin layer over the first plastic material.

5. The method of claim 1, wherein said step of providing a sealing structure comprises providing a plurality of barriers movably connected to one of said mold halves around the mold cavity and spring-loaded toward the other of the mold halves to enclose the mold cavity when the first and second mold halves are moved toward and away from each other.

6. The method claim of claim 5, wherein the step of providing a sealing structure comprises providing a recess in the other of said mold halves such that the plurality of barriers seat therein.

7. A method of injection molding a layered plastic component comprising:

providing a sealing structure around the periphery of a mold cavity formed between first and second mold halves to contain plastic material in the cavity during injection;

closing the first and second mold halves to a first gap therebetween;

injecting a first plastic material into the cavity;

closing the first and second mold halves together to a full closure position, said step of closing to a full closure position commencing when said step of injecting a first plastic material is 95% to 99% complete;

holding the first and second mold halves together for a period of time sufficient to at least partially solidify the first plastic material;

opening the first and second mold halves to a second gap therebetween;

moving by lateral actuation at least one stop member into position between the first and second mold halves by providing the stop member laterally moveable with respect to one of the first and second mold halves, and moving the step member between a first position in alignment with a corresponding pocket on the other mold half and a second position out of alignment with the pocket and abutting the other mold half to form a gap between the first and second mold halves;

injecting a second plastic material into the mold cavity; and closing the first and second halves together against said stop member, said step of closing the first and second mold halves together against the stop member commencing when said step of injecting a second plastic material is 95% to 99% complete.

8. The method of claim 7, wherein said first and second gaps are equal.

9. The method of claim 7, wherein said first plastic material comprises a relatively inexpensive material and said second plastic material is relatively expensive material and forms a thin layer over the first plastic material.

10. The method of claim 9, wherein said second material comprises a metallizable material.

11. The method of claim 7, wherein said step of providing a sealing structure comprises providing a plurality of barriers movably connected to one of said mold halves around the mold cavity and spring-loaded toward the other of the mold halves to enclose the mold cavity when the first and second mold halves are moved toward and away from each other.

12. The method of claim 11, wherein the step of providing a sealing structure comprises providing a recess in the other of said mold halves such that the plurality of barriers seat therein.

13. A method of injection molding a metallizable plastic part comprising:

providing a sealing structure around the periphery of a mold cavity formed between first and second mold halves to contain plastic material in the cavity during injection;

closing the first and second mold halves to a first gap therebetween;

injecting a polyester material into the cavity;

closing the first and second mold halves together to a full closure position;

holding the first and second mold halves together for a period of time sufficient to at least partially solidify the polyester material;

opening the first and second mold halves to a second gap therebetween;

moving by lateral actuation at least one stop member into position between the first and second mold halves by providing the stop member movable with respect to one of the first and second mold halves, and moving the stop member between a first position in alignment with a corresponding pocket in the other mold half and a second position out of alignment with the pocket and abutting the other mold half to form a gap between the first and second mold halves;

injecting a metallizable material into the mold cavity against the polyester material; and closing the first and second halves together against said stop member, and maintaining the mold halves in this position for solidification of the metallizable material to form the metallizable part.

14. The method of claim 13, wherein said step of providing a sealing structure comprises providing a plurality of barriers movably connected to one of said mold halves around the mold cavity and spring-loaded towards a recess in the other of the mold halves such that the plurality of barriers seat therein and to enclose the mold cavity when the first and second mold halves are moved toward and away from each other.

* * * * *